May 8, 1928.
D. MacKENZIE
1,668,856
PHOTOGRAPHIC PRINTING MACHINE
Filed April 8, 1924
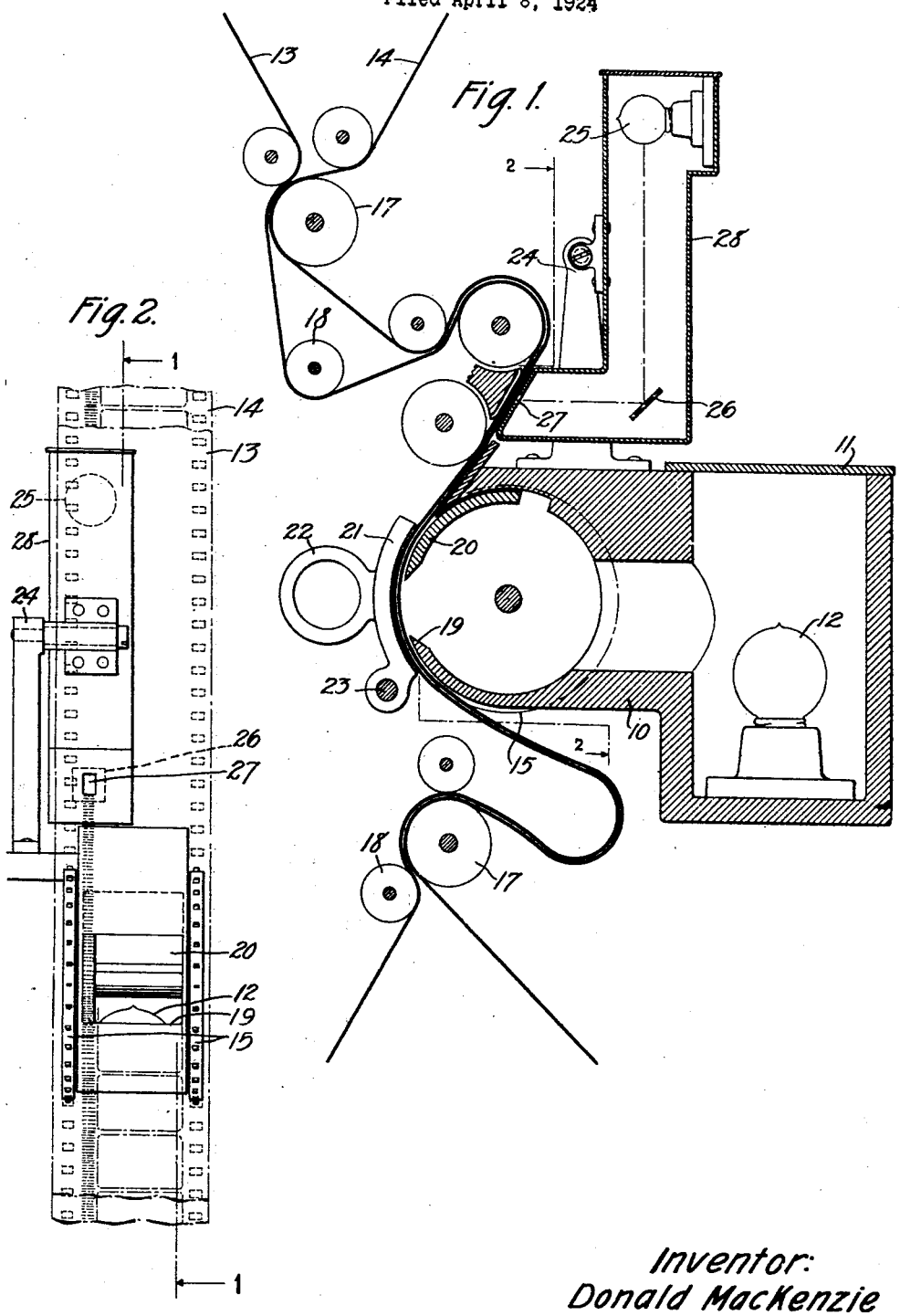
Inventor:
Donald MacKenzie
by ℰ.W.Adam Atty.

Patented May 8, 1928.

1,668,856

UNITED STATES PATENT OFFICE.

DONALD MacKENZIE, OF EAST ORANGE, NEW JERSEY, ASSIGNOR TO WESTERN ELECTRIC COMPANY, INCORPORATED, OF NEW YORK, N. Y., A CORPORATION OF NEW YORK.

PHOTOGRAPHIC-PRINTING MACHINE.

Application filed April 8, 1924. Serial No. 704,904.

This invention relates to means for and the method of reproducing sound and motion pictures in synchronism. More specifically, this invention provides means for simplifying the printing of picture and sound records from a negative film onto a single positive film at the same time and by the same printing machine.

Due to variations in lighting conditions and in the character of the objects being photographed motion picture negatives may vary greatly in average contrast throughout the length of a single roll of film. It is customary to correct for this by varying the intensity of the light used for making positive records from the negatives. Sound records on negative films on the other hand may be produced under more easily controllable conditions, so that usually no such correction is required or desirable, or, if required, the correction will be different from that of the corresponding portion of the picture record.

In accordance with this invention separate lighting means are used for the picture record and the sound record respectively. With this arrangement the amount of exposure of the positive motion picture record can be varied without correspondingly varying the exposure of the sound record, and if desired the exposure of the sound record can be independently varied.

A feature of the invention is the provision of an auxiliary lighting means which can be readily attached to existing printing machines.

This invention will be best understood by the following description and the claim appended thereto, reference being had to the accompanying drawings in which Fig. 1 is a sectional view of a portion of the printing machine taken approximately on line 1—1 of Fig. 2.

Fig. 2 is a partial front view of Fig. 1.

Similar reference characters refer to similar parts throughout the several views.

The numeral 10 designates a portion of the casing on which the operating mechanism is mounted. This casing 10 is provided with a chamber 11 in which an incandescent lamp 12 is mounted and adapted to furnish the light for printing the pictures on the positive film 13 from the negative film 14. These films are operatively mounted on a duplex sprocket wheel 15 (shown in Fig. 2) which is preferably rotated at a uniform rate of speed by any suitable actuating mechanism (not shown). Negative film 13 and positive film 14 thread through a path defined by a plurality of rollers 17 and 18 and are held against the guide 19 and the adjustable shutter 20 by means of a spring pressed member 21 which is provided with a finger hold 22. This member 21 is pivoted on the shaft 23 which is secured to the frame of the machine. The apparatus just described is typical of motion picture printing machines now in use, except that the left hand end of the opening between member 19 and shutter 20 has been closed to prevent light from lamp 12 from striking the narrow band of the film containing the sound record.

On the upper part of casing 10 there is mounted a support 24 on which an L shaped casing 28 is secured. In the top portion of this casing there is mounted an incandescent lamp 25 from which the light rays are directed against a plane mirror 26 provided to divert the light rays at right angles from their source into a rectangular shaped aperture 27 disposed in juxtaposition with the sound reproducing record of the negative film 14 as shown in Fig. 2. The operation of the machine is as follows: The negative and the positive film are mounted on a plurality of rollers and are actuated by means of an ordinary duplex sprocket wheel which may be rotated through the movement of any suitable operating mechanism (not shown).

The portion of the negative film 14 carrying the sound record together with the portion of the positive film on which the sound record is to be printed pass in front of the aperture 27 which is made in a portion of the lighting chamber 28 shown in Fig. 1. The beam of light generated by the incandescent lamp 25 is projected into this aperture onto the films by means of the plane mirror 26 which is disposed to deflect the light rays at right angles with respect to their generating source. It is understood that the intensity of light of the incandescent lamps 12 and 25 may be adjusted if desired by controlling the flow of current through the lamps.

The picture record is disposed by the side of the sound record and passes in front of its respective aperture in the lighting chamber 11. This lighting chamber is provided with an adjustable shutter adapted for controlling the time exposure of the pictures.

By the use of this invention it is obvious that the best results in the picture and sound records may be obtained in the development of the film.

What is claimed is:

In a photographic printing machine, a negative film having both a picture record and a sound record thereon, means for continuously progressing said film, means for progressing a sensitized positive film simultaneously with said negative film, and means for printing the sound record independently of the picture record, comprising, an L-shaped casing, a second casing, an incandescent lamp mounted in each of said casings, said second casing having an aperture in the line of the light rays disposed to register with the picture portion of the negative film, said L-shaped casing having an aperture disposed to register with the sound portion of the negative film and a deflector for deflecting the light rays onto the apertured portion of said L-shaped casing.

In witness whereof, I hereunto subscribe my name this 27th day of March, A. D. 1924.

DONALD MacKENZIE.